May 7, 1940. A. DABRASKY 2,199,392
VEHICLE
Filed March 27, 1939 3 Sheets-Sheet 1
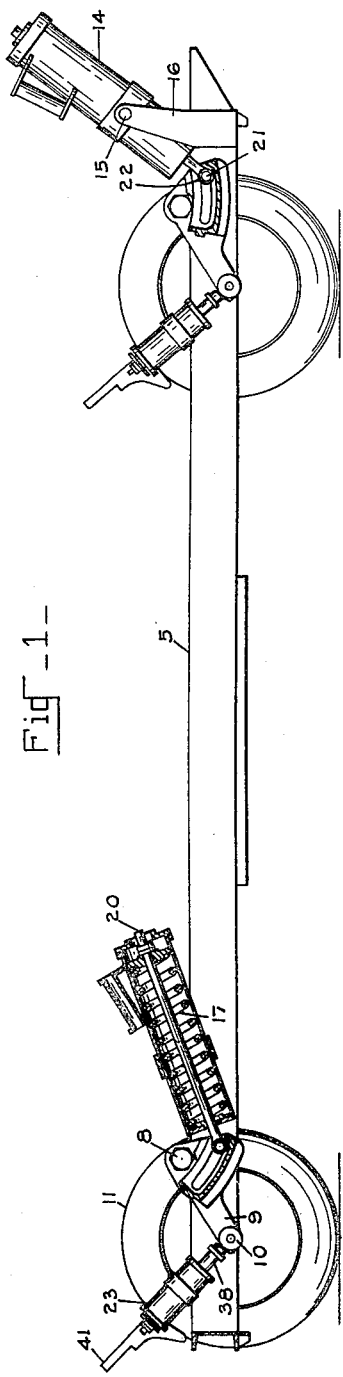
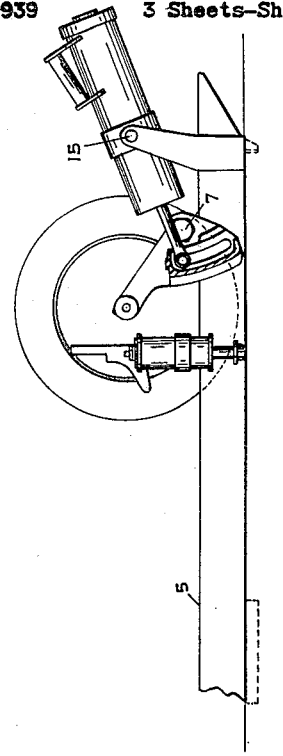
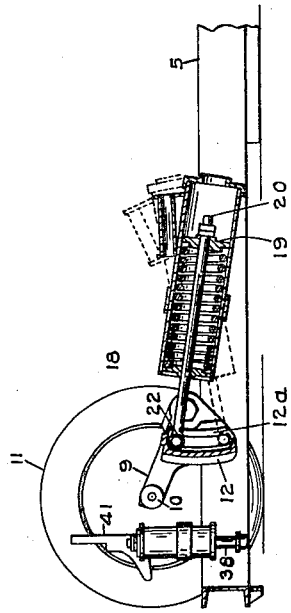
Inventor
August Dabrasky
By- Kessenich & Church
Attorneys

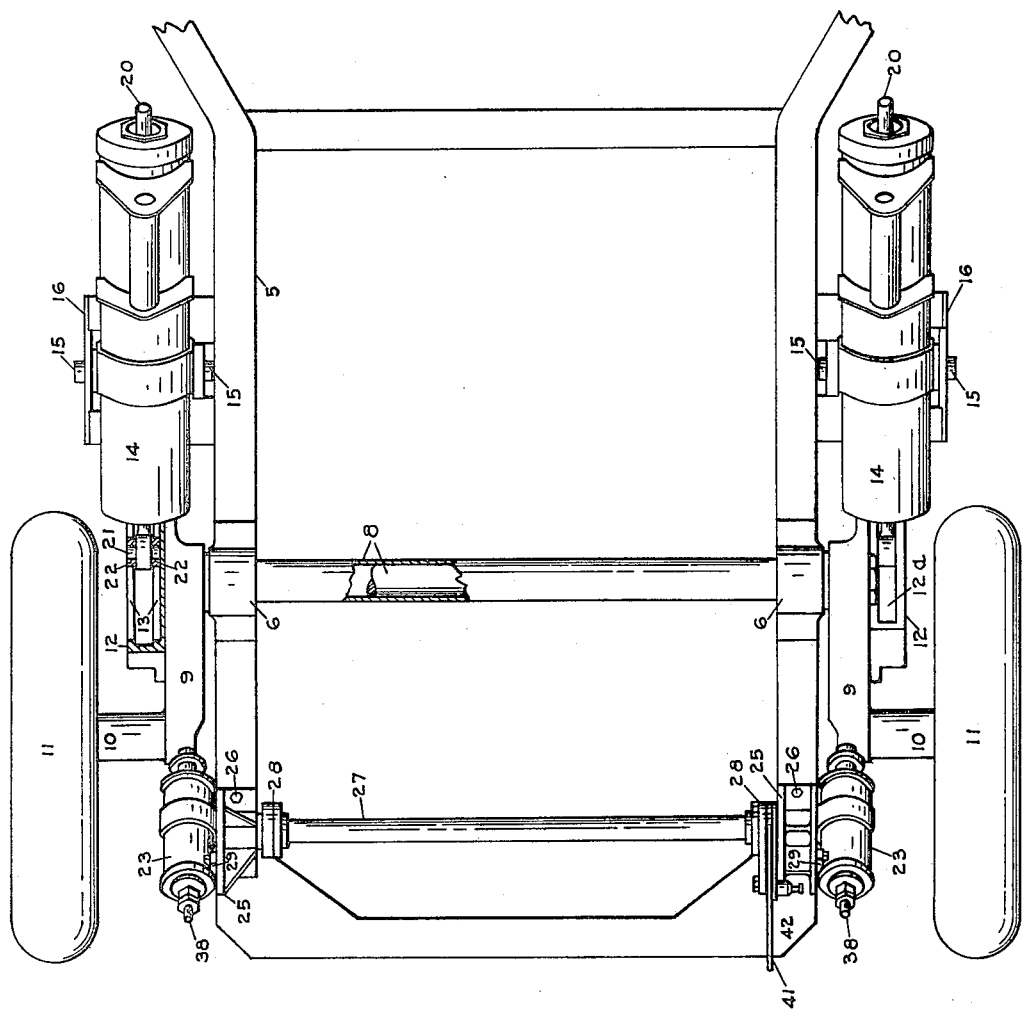

May 7, 1940.   A. DABRASKY   2,199,392
VEHICLE
Filed March 27, 1939   3 Sheets-Sheet 3

Inventor
August Dabrasky

Patented May 7, 1940

2,199,392

UNITED STATES PATENT OFFICE 2,199,392

VEHICLE

August Dabrasky, Washington, D. C.

Application March 27, 1939, Serial No. 264,346

11 Claims. (Cl. 267—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a vehicle and more particularly it has reference to a vehicle in which the frame or body may be lowered and raised relative to the ground.

In vehicles of this type which are used to facilitate loading and unloading or to include a gun mount which is to be emplaced on the ground for firing it is desirable that the lowering mechanism be simple, that the resilient suspension be capable of rapid disconnection, and that the manual operations involved in lowering and raising be few in number and easily performed.

In meeting these requirements it is proposed in this invention to arrange the balancing means so that it may participate in carrying the load during traveling and also function to raise the wheels from the ground when the frame has been lowered.

A further object is to provide simple and efficient resilient buffers to serve as a suspension means and be readily moved into and out of engagement with the cranks carrying the wheels.

The specific nature of the invention as well as other objects and advantages thereof will clearly appear from a description of a preferred embodiment as shown in the accompanying drawings in which:

Fig. 1 is a view in side elevation and partly in section of a vehicle constructed in accordance with the invention and shown in the traveling position.

Fig. 2 is a similar view of the rear wheel showing the relation of the parts when the frame has been lowered to the ground with the wheel still in contact with the ground.

Fig. 3 is a view of a front wheel raised from the ground.

Fig. 4 is a plan view, with parts broken away, of the rear part of the vehicle.

Figure 5:
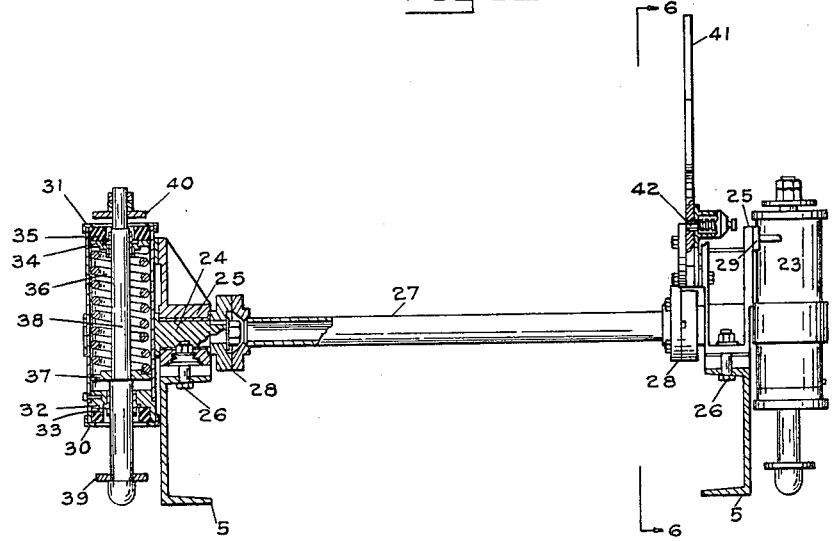
Fig. 5 is a view in rear elevation and partly in section of the buffer assembly.
Figure 6:
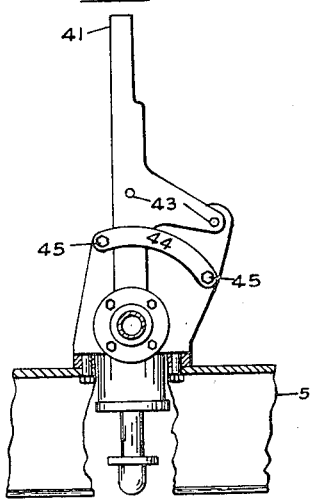
Fig. 6 is a sectional view on the line 6—6 of Fig. 5.

Referring to the drawings by characters of reference the vehicle comprises a frame 5 adapted to carry a load which may be a gun and mount and provided near its ends with bearings 6 for rotatably mounting telescoped front axles 7—7 and rear axles 8—8.

On each end of an axle there is fixed a crank arm 9 having a spindle 10 for a wheel 11. Each crank arm is provided with a downwardly extending projection 12 having a channel guide 12a whose opposite walls are formed with aligned arcuate slots 13—13.

A balancing means associated with each crank comprises a cylinder 14 which is mounted by means of trunnions 15 in a bracket 16 on the frame 5. A resilient element, conveniently a spring 17, is seated on the cylinder end 18 adjacent the crank and acts on a head 19 on a piston rod 20. One end of the rod 20 is inserted in the channeled guide of the projection 12 and carries a transversely disposed pin 21 that mounts rollers 22—22 riding in the arcuate slots 13—13.

It will be noted that the crank arm 9 has approximately the same angular relation to the frame 5 in both the traveling and the lowered or emplaced positions, the movement of the crank arm being through approximately ninety degrees and crossing the plane of the frame. As seen in Fig. 1 the load on axle 8 acts through a minimum effective lever arm and the moment of this force is balanced by the spring load acting through the maximum effective lever arm represented by the distance between the pin 21 and axle 8. This condition is substantially maintained throughout the movement of the crank arm. As the frame 5 is lowered to the position of Fig. 2 the pin 21 shifts across the vertical plane containing the axis of rotation of the crank arm, that is axle 8, and will be located in the lower end of slot 13, as indicated in dotted lines. It will be observed that the effective lever arm of the piston rod 20 thereby decreases as the load on the spring increases.

By reference to Fig. 3 it will be observed that the slots 13 are on true arcs about the trunnion axis 15 as a center so that the cylinder can be manually rotated about its trunnions without further compressing the spring. This provision enables the cylinder to be easily moved from the position shown in dotted lines Fig. 2 to the full line position shown in Figs. 2 and 3, for the purpose of moving the piston vertically across the axial line of the axle whereby the spring becomes effective to swing the crank upwardly a slight distance and raise the wheel from the ground. Suitable means (not shown) are provided for limiting this movement.

A pair of buffer cylinders 23—23 for the pair of cranks at each end of the vehicle are positioned in spaced relation to the corresponding axle 7 or 8 and each has a trunnion 24 mounted in a bearing 25 which is fixed to the frame 5 by bolts 26. A shaft 27 is connected to the inner ends of the trunnions by coupling members 28 and provides for simultaneous rotation of the cylinders 23 on their trunnions 24. The cylinders 23 are disposed on the outer sides of the frame and are preferably provided with a wearing and guide plate 29 adapted to rub against the adjacent bearing 25.

The buffer cylinders 23 are identical and each includes a retainer ring 30 on its lower end and a similar retainer ring 31 on its upper end. An apertured head 32 fixed in the cylinder adjacent the lower end thereof forms a seat for a resilient ring 33 which is held in place by the retainer ring 30 while an apertured head 34 in the upper part of the cylinder forms a seat for a resilient ring 35 which is held in place by the ring 31. The upper head 34 also seats a spring 36 which acts on a disk 37 carried by a piston rod 38. The ends of the piston rod project from opposite ends of the cylinder and carry disks 39 and 40 for respectively engaging the lower ring 33 and the upper ring 35.

The shaft 27 and the associated buffer cylinders 23 are rotated by means of a handle 41 which is attached to one of the coupling members 28. A latch 42 carried in the bearing 25 adjacent the handle is adapted to selectively engage a pair of openings 43—43 in the handle to hold the handle in two positions of adjustment, one position being shown in Fig. 1 in which the piston rods 38 engage the outer portions of the cranks, and the other position shown in Fig. 2 in which the piston rods have been moved out of engagement with the cranks. The handle is positioned between the bearing 25 and a guide plate 44 and may be moved within the limits of bolts 45—45 which carry the guide plate.

The vehicle is prepared for traveling when the parts are in the positions shown in Fig. 1, the crank arms being inclined with respect to the frame as previously pointed out, the piston rods 20 of the balancing means being at the outer ends of the links 12, and the piston rods 38 of the buffers being in engagement with the cranks and substantially at right angles thereto. In this position the springs of the balancing means and of the buffers comprise the resilient suspension means of the vehicle.

The operation of lowering the frame to the ground consists in acting on the handles 41 to disconnect the buffers from the cranks after which the frame and any load thereon is just balanced. If pressure is now applied to the frame, by pushing or by a man standing thereon, the frame is gently lowered until it rests on the ground, the spring 17 being compressed.

When it is desired to raise the wheels from the ground in order to add their weight to the frame and obtain greater stability, the cylinders 14 are rotated on their trunnions 15 by applying pressure to one end. This operation changes the relationship of the piston rod with respect to the axis of the axle so that the piston rod assumes the position shown in Fig. 3. As soon as the piston rod crosses the axial line of the axle, the spring becomes effective to swing the crank upwardly and thereby raise the wheel from the ground. In order to return the wheels to the ground the above procedure is reversed whereby the parts reassume the position shown in dotted lines in Fig. 2.

In restoring the parts to the traveling position it is only necessary for an operator to exert small lifting force sufficient to overcome the slight frictional resistances of the rotary parts to lift the end of the frame and initiate the elevating movement which is then accomplished by the springs 17. The handles 41 are then acted on to move the piston rods of the buffers into engagement with the cranks.

I claim:

1. In a vehicle, a frame, supporting units for the frame each including a crank rotatably mounted on the frame and having a raised and a lowered position relative to the frame, a wheel on the crank, a projection on the crank and having an arcuate guide, a cylinder pivotally mounted on the frame, a spring in the cylinder, a piston in the cylinder and acted on by the spring, said piston having an outer end engaging the arcuate guide of the projection and manually movable up the guide in a vertical direction to cross the pivotal axis of the crank arm when the crank arm is in lowered position, a resilient buffer for each crank pivotally mounted on the frame and means for moving the buffer into and out of engagement with the crank.

2. In a vehicle, a frame, supporting units for the frame each including a crank rotatably mounted on the frame, a wheel on the crank, a projection fixed on the crank adjacent its axis of rotation, a resilient balancing means between each projection and the frame and pivotally mounted on the frame, a sliding connection between the balancing means and the projection, a resilient buffer for each crank pivotally mounted on the frame, and means for moving the buffer into and out of engagement with the crank.

3. In a vehicle, a frame, supporting units for the frame each including a crank rotatably mounted on the frame, a wheel on the crank, a projection on the crank, a resilient balancing means between each projection and the frame and pivotally mounted on the frame, a sliding connection between the balancing means and the projection, and a quick removable resilient connection between each crank and the frame.

4. In a vehicle, a frame, supporting units for the frame each including a crank rotatably mounted on the frame and having a raised and a lowered position with respect to the frame of approximately equal angular amounts above and below the frame, a wheel on the crank, a projection on the crank adjacent its axis of rotation and movable with the crank across the vertical plane containing the axis of rotation of the crank, a cylinder pivotally mounted on the frame, a load suspension spring in the cylinder, a piston in the cylinder acted on by the spring and including a piston rod having an outer end engaging the projection, a resilient buffer for each crank pivotally mounted on the frame, and means for moving the buffer into and out of engagement with the crank.

5. In a vehicle, a frame, supporting units for the frame each including a crank rotatably mounted on the frame and movable approximately equal angular amounts above and below the frame, a wheel on the crank, a projection on the crank, a cylinder pivotally mounted on the frame, a load suspension spring in the cylinder, a piston in the cylinder acted on by the spring and including a piston rod engaging the projection to move it across the vertical plane containing the axis of rotation of the crank, and a quick removable resilient connection between each crank and the frame.

6. In a vehicle, a frame, supporting units for the frame each including a crank rotatably mounted on the frame and movable approximately equal angular amounts above and below the frame, a wheel on the crank, a resilient balancing means between each crank and the frame and pivotally mounted on the frame to change its effective lever arm on movement of the crank, and a quick-removable resilient connection between each crank and the frame.

7. In a vehicle, a frame, supporting units for the frame each including a crank rotatably mounted on the frame, a wheel on each crank, a resilient balancing means between each crank and the frame, a shaft on each end of the frame, a buffer cylinder on each end of each shaft, a spring in each cylinder, a piston in each cylinder acted on by each spring, and means for rotating each shaft to move the pistons into and out of engagement with adjacent cranks.

8. In a vehicle, a frame, supporting units for the frame each including a crank rotatably mounted on the frame, a wheel on each crank, a resilient balancing means between each crank and the frame, a resilient buffer for each crank pivotally mounted on the frame, and means for moving the buffers into and out of engagement with their respective cranks in the vicinity of the axis of the corresponding wheel.

9. In a vehicle, a frame, supporting units for the frame, each including a crank rotatably mounted on the frame, a wheel on each crank, a resilient balancing means between each crank and the frame, and a quick-removable resilient connection between the frame and each crank in the vicinity of the axis of the corresponding wheel.

10. In a vehicle, a frame, supporting units for the frame each including a crank rotatably mounted on the frame, a wheel on each crank, a resilient balancing means between each crank and the frame, a resilient buffer unit trunnioned in opposite sides of the frame a shaft connecting the trunnioned buffer units, and means for rotating the shaft to move the buffer units into and out of engagement with adjacent cranks.

11. In a vehicle, a frame, an axle rotatably mounted on the frame, a crank on each end of the axle, a wheel on each crank, a resilient unit for each crank trunnioned in the frame, a shaft connecting the trunnioned units, and means for rotating the shaft to move the units into and out of engagement with adjacent cranks.

AUGUST DABRASKY.